Feb. 13, 1940.    H. J. PAYNTER ET AL    2,189,831
FISH CANNING MACHINE
Filed July 26, 1938    4 Sheets-Sheet 4
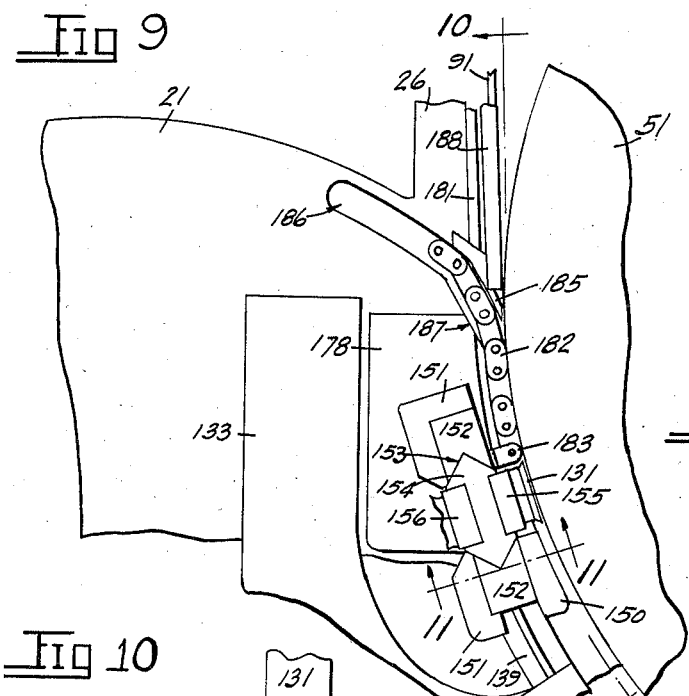
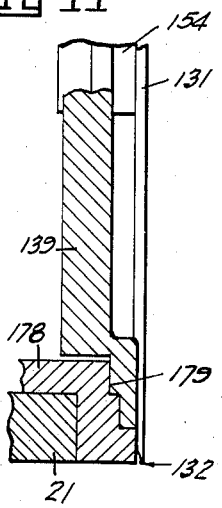
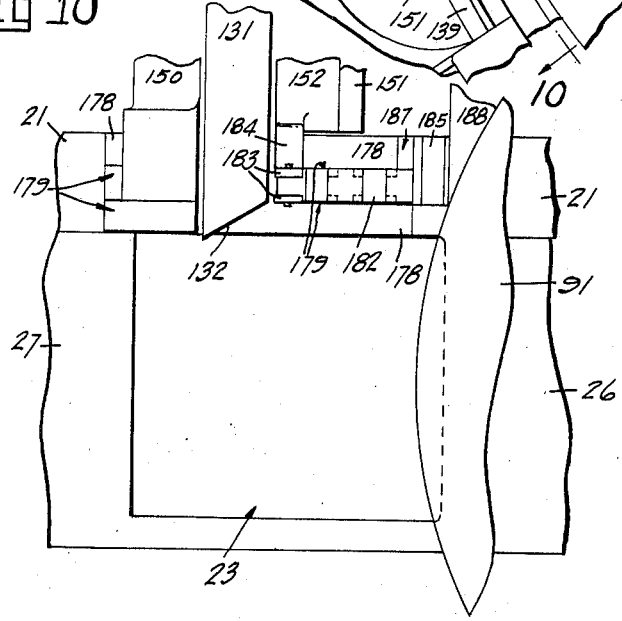
INVENTORS
Horace J. Paynter
Walter C. Rooney
BY Ivan D. Thornburgh
Charles H. Crue
ATTORNEYS Patented Feb. 13, 1940

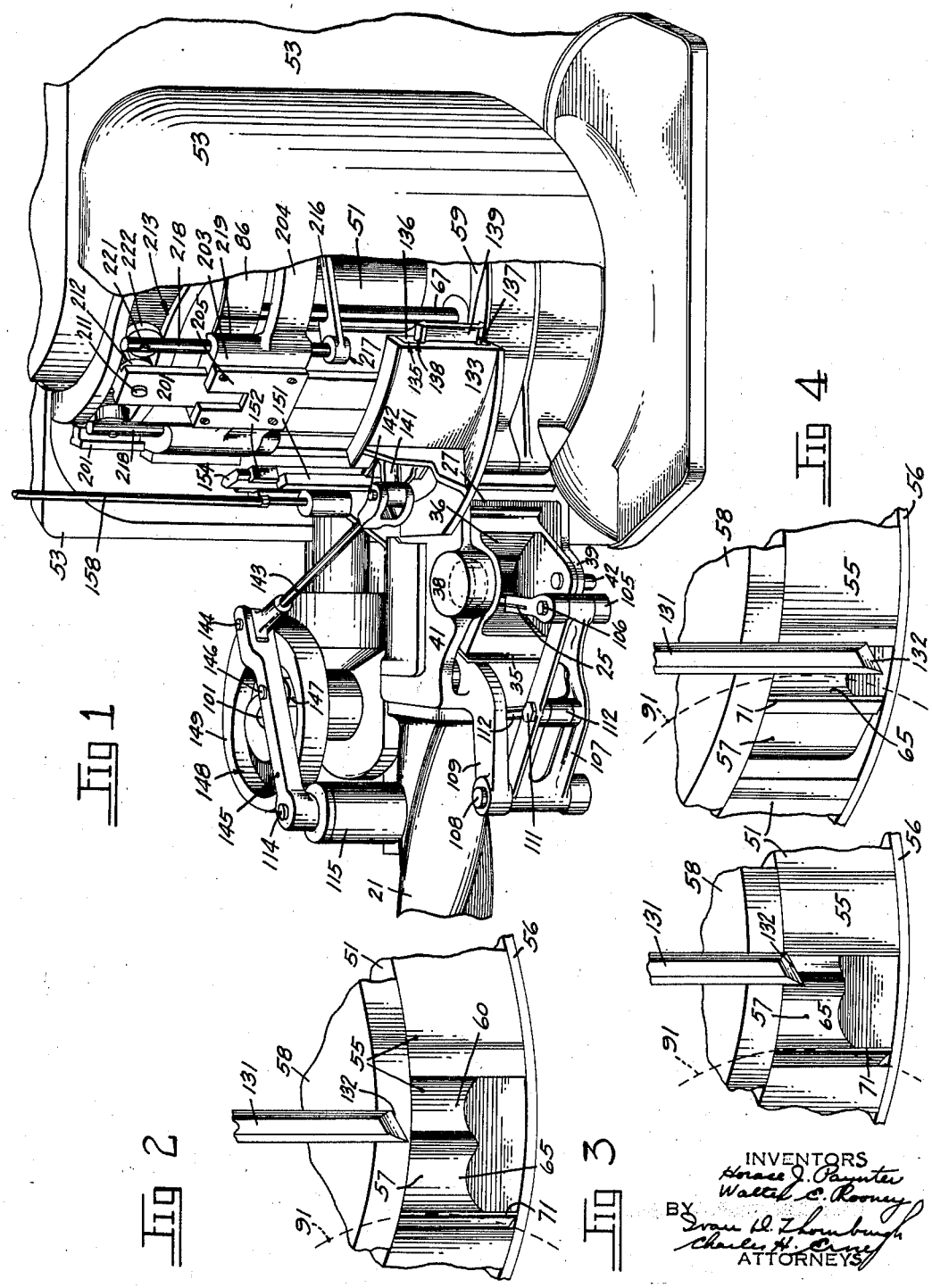

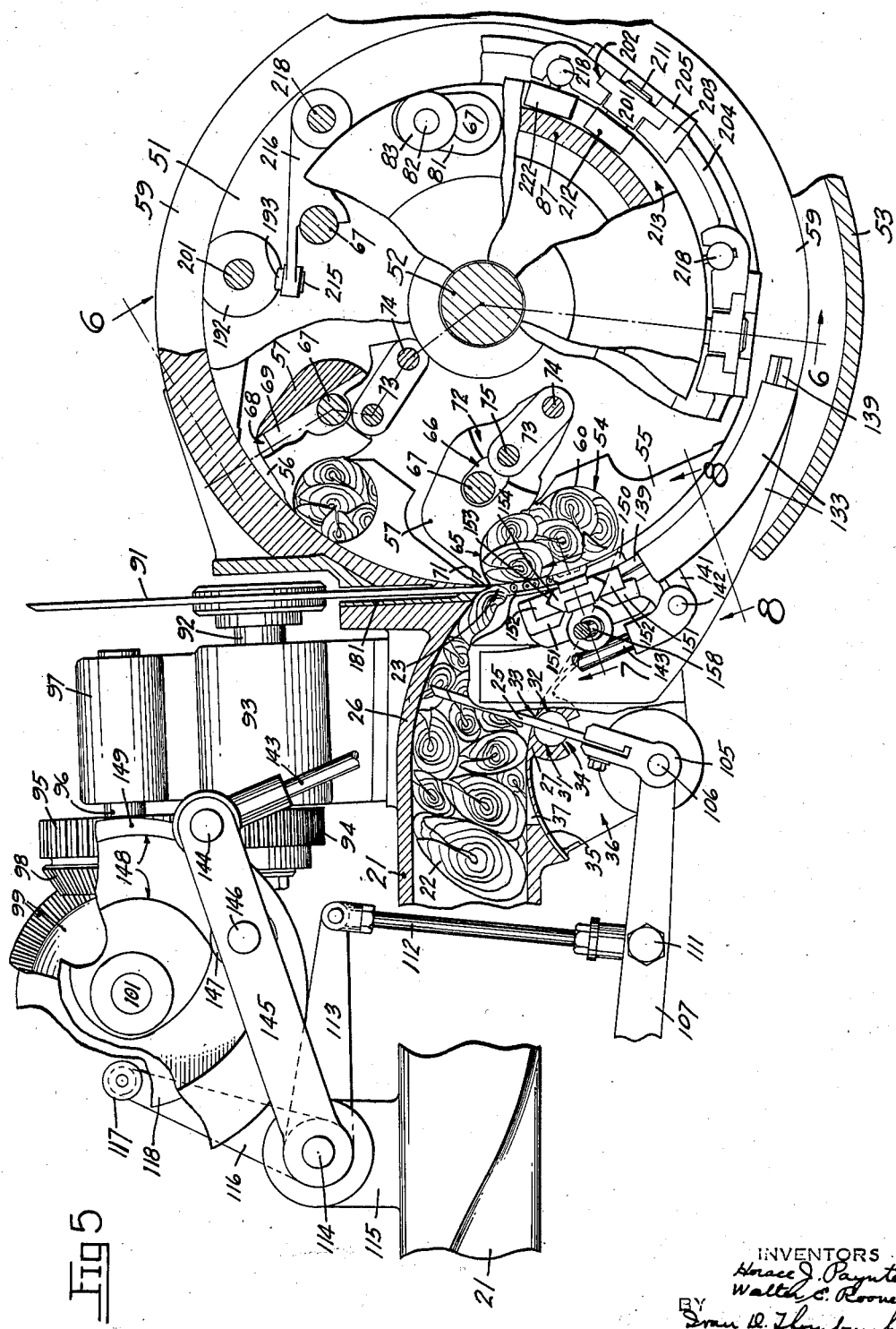

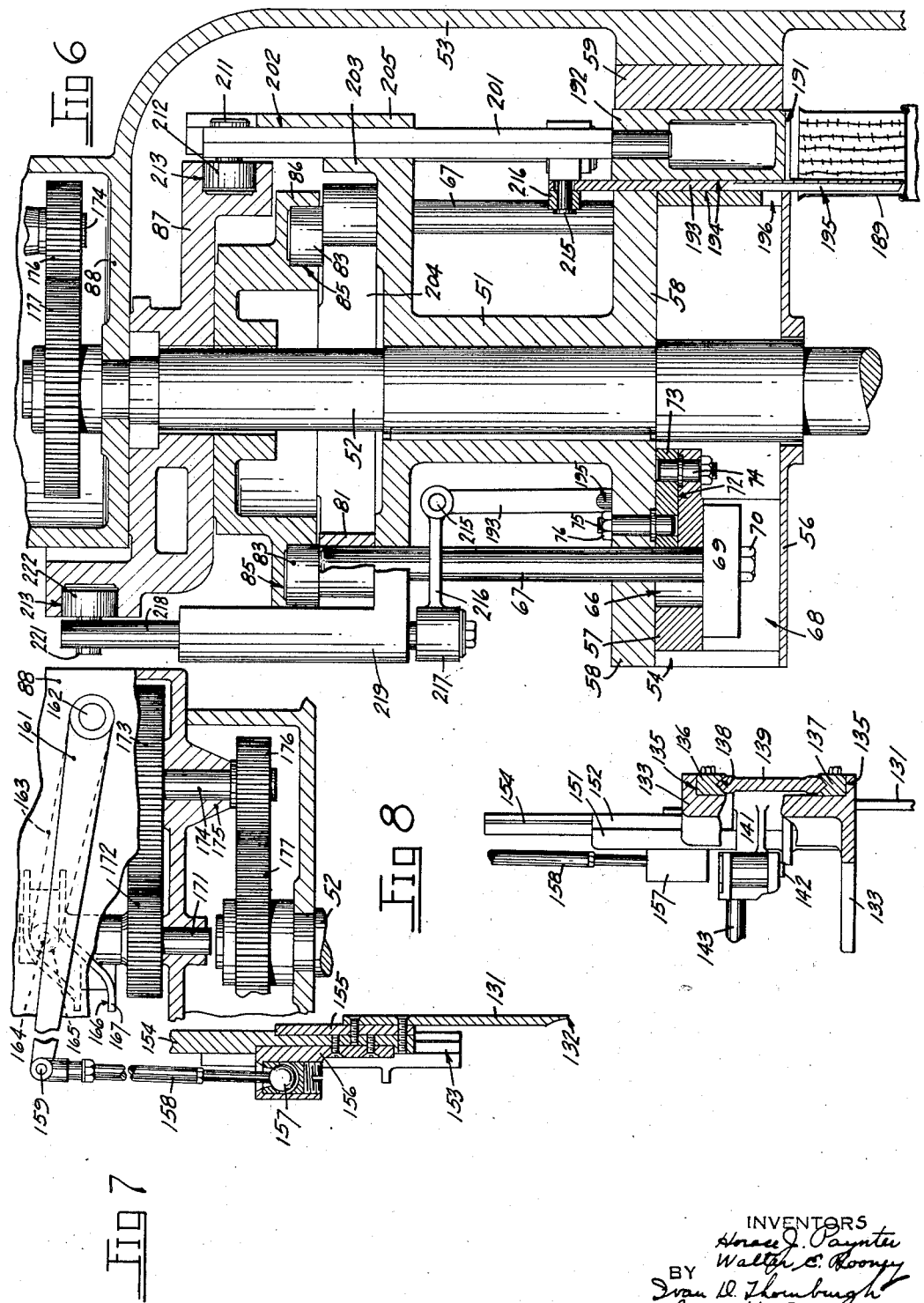

2,189,831

UNITED STATES PATENT OFFICE 2,189,831

FISH CANNING MACHINE

Horace J. Paynter, Union, N. J., and Walter E. Rooney, Bellingham, Wash., assignors to American Can Company, New York, N. Y., a corporation of New Jersey Application July 26, 1938, Serial No. 221,420

8 Claims. (Cl. 226—101)

The present invention relates to fish canning machines and has particular reference to an improvement in the measuring of a charge of fish sufficient to fill a can and in the cutting, trimming and severing of the measured charge from a fish mass contained in a supply tunnel. In some respects the present invention is an improvement of certain features disclosed in the Walter E. Rooney United States Patent 2,044,813, issued June 23, 1936, and reference should be had to this patent for a fuller understanding of the complete fish canning machine of which the mechanism shown in the accompanying drawings may constitute a substitute part.

An object of the present invention is the provision of cutting and trimming mechanism for association with measuring chambers of a fish canning machine which operate to insure a more accurate measurement of fish and a smoother, better appearance of the measured charge to be subsequently filled into the can.

Another object is the provision of a measuring chamber mechanism for use in fish canning machines which functions to provide rapid and accurate measurement of the fish and which compacts or compresses the same into a properly shaped charge for subsequent filling into a can.

A still further object of the invention is the provision of a cutting and trimming mechanism of the character described which is adapted to high speed production for segregating a compressed measured fish charge, both cutting and trimming being done while the fish is moving, the movement of the trimming elements being such as to produce a straight longitudinal shear cut as contradistinguished from a biased or angular cut, thus improving the appearance while insuring better packing of the charge within the can.

Another object is the provision of a measuring device so constructed and actuated as it cooperates with a rotatable cutter to properly place the fish previously fed to it by feeding instrumentalities and to further compress it for better cutting and trimming.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a portion of a fish canning machine embodying the present invention, the view showing the outside of the machine and having a part broken away to also disclose an inside elevation;

Figs. 2, 3 and 4 are fragmentary perspective views of the trimming device showing its association with a measuring chamber of the machine of Fig. 1, the three views illustrating different positions of the trimming device and other movable parts of the measuring chamber;

Fig. 5 is a partial plan section and partial plan view of the mechanism illustrated in Fig. 1, parts being broken back at different levels to better show certain features;

Fig. 6 is a longitudinal sectional view taken substantially along the broken line 6—6 in Fig. 5 parts being shown in elevation and parts being broken away;

Fig. 7 is a sectional detail parts shown in full as viewed substantially along a position indicated by the section line 7—7 in Fig. 5, parts also being broken away;

Fig. 8 is a similar view taken substantially along the line 8—8 in Fig. 5;

Fig. 9 is a top plan view of a part of the elements illustrated in Fig. 5 and showing these parts on an enlarged scale;

Fig. 10 is a fragmentary detail of the mouth of the measuring chamber as viewed substantially along the broken line 10—10 in Fig. 9; and Fig. 11 is a sectional detail taken substantially along the line 11—11 in Fig. 9.

The present invention is primarily concerned with the continuous discharging of fish from a stationary supply tunnel into successive measuring chambers. The filling of the supply tunnel with fish and handling of the fish before it is ready for discharge forms no part of the present invention and will not be further mentioned other than to say that the Rooney Patent 2,044,813 deals with these features in some detail.

After a chamber is filled it is contracted, the enclosed fish being compressed and shaped into a measured can filling charge. The plurality of measuring chambers are carried on a constantly rotating turret. One end of the supply tunnel is located at the periphery of the turret and during the rotation of the turret each measuring chamber is passed by the discharge end of the supply tunnel.

Each measuring chamber is composed of wall parts which permit a full open position for the chamber at the time a chamber is passing the discharge opening of the supply tunnel. It is then that such a chamber receives fish from the tunnel, instrumentalities such as a feed fork forcing the fish out of the tunnel opening. As soon as the fish mass fills the measuring chamber, the chamber begins its contraction, all of this taking place without any interruption in the bodily movement of the chamber with the turret. This contracting of the chamber compresses and shapes the enclosed charge of fish and during such compression the chamber fish is being cut and trimmed to segregate it from the fish remaining in the tunnel.

The details of construction of the parts constituting the measuring chamber and the cutting and trimming devices which function to segregate this measured compressed charge of fish from the fish remaining in the tunnel is of particular interest in the present consideration of the invention.

A rotary cutter is disposed adjacent the discharge end of the supply tunnel and severs the fish mass extending within a measuring chamber while the chamber is contracting with the resulting compression of the fish charge. To effect such a filling, cutting and compression of the fish charge and also to trim cut the fish charge adjacent the rear edge of the chamber, a movable front wall part of each measuring chamber is adapted to shift its position relative to a fixed rear wall part.

The rear wall part is fixed as to the turret but is constantly advanced as the turret rotates. The filling of the chamber begins before this rear wall comes opposite the tunnel. The front wall part is movable as to the turret but during filling, cutting and compression remains substantially stationary while the turret moves up on it. It thus remains at one side of the discharge opening of the tunnel this being at the cutting edge of the rotary cutter.

There may appear at this point in the description a paradoxal use of the terms "movable" and "fixed" relating to the chamber walls. However, no difficulty will be experienced if it will be remembered that the fixed or rear wall is always moving relative to the tunnel mouth and the movable or front wall, while carried on a constantly movable member (the turret), shifts its position on the turret to remain momentarily at the cutter's edge.

The trimming action is effected by a vertically movable cutting knife. This knife in addition to moving up and down, moves back and forth along the periphery of the turret. When descending for a trim cut it advances alongside of the fixed wall part of a measuring chamber and cuts the fish at this point during its compression. The cooperation of trimming and cutting of the fish mass in the chamber is such that the fully compressed charge of fish when finally segregated from the fish remaining in the tunnel, will present a pleasing appearance for the can fill without bias cutting.

After a measuring chamber with its fish charge has passed the supply tunnel it will be introduced into a can during which time the can is vented. This further can filling treatment is fully explained in the Rooney patent mentioned above and will be only briefly touched on in this present description.

The supply tunnel is designated by the numeral 21 (Figs. 1 and 5) and cut fish 22 is moved along the tunnel in any suitable manner. The fish pieces in the tunnel are kept closely packed together and are constantly moved toward a discharge opening or mouth 23 of the tunnel. The fish mass is swept out through the discharge opening 23 by a fork 25. This fork slides in through the side wall of the tunnel and passes into a mass of fish. Following this it moves forward crowding the fish along with it.

The tunnel at its discharge end is formed with curved side walls 26, 27 and the outer prongs of the fork 25 when forcing the fish forward pass close to the outer curved wall 26. This fork has a compound movement and a single cycle of its operation may be considered to consist of four steps. These steps are, first, the forcing of the fork prongs into the fish mass, next, swinging of the fork forward for a feeding stroke, thence withdrawing the fork prongs from the fish and finally the return of the fork to its original position ready to begin the next cycle. These movements are effected in a manner now to be described.

The prongs of the fork 25 project through and are slidably mounted in a vertically disposed rock shaft 31. This shaft is substantially as long as the tunnel is high. The shaft is carried in spaced pockets or seats 32. An inner space 33 and an outer space 34 between the seats 32 provide clearance for the fork when it moves laterally during oscillation of the shaft; this being at the time the fork is advancing for a feeding stroke or is moving backward on a return stroke.

The seats 32 for the shaft are formed adjacent an outer cylindrical wall 35 of a segment 36 which is mounted for oscillation within an opening 37 formed in the inner curved side wall 27 of the tunnel. The segment 36 rocks back and forth in an upper bearing 38 and in a lower bearing 39, these bearings being in vertical alignment and being formed in top and bottom walls of a boxlike projection 41 of the tunnel wall 27.

At the bottom the segment is secured to a vertically disposed shaft 42 which extends down through the bearing 39. By means of this rock shaft the segment is moved forward and backward in proper time to assist in the control of the fork 25, the cylindrical wall 35 of the segment maintaining a tight fit within the side wall of the tunnel. This keeps the side wall opening 37 closed against any loss of fish from the tunnel. The remaining control of the fork, that is, pressing the fork prongs into the fish or withdrawing the same will be later described.

Just beyond the discharge opening 23 of the tunnel a turret 51 (Figs. 5 and 6) is mounted for rotation. The turret is carried on a constantly rotating vertical shaft 52. This shaft is mounted in suitable bearings formed in a main frame housing 53 (see also Fig. 1) of the apparatus. The turret 51 carries a plurality of spaced measuring chambers 54. During the rotation of the turret, each measuring chamber passes alongside of the discharge opening 23 of the tunnel and during this movement fish is discharged into the chamber.

Each measuring chamber 54 is formed in part by a fixed jaw member 55 which is disposed above a horizontal floor plate 56 carried by the turret. The measuring chamber is also formed by a cooperating movable jaw member 57 which is also mounted on the floor 56 and has sliding movement between this floor member and a horizontal flange wall 58 of the turret 51. This horizontal section of the turret moves inside of a surrounding circular ring housing 59 mounted in and carried by the frame 53.

Each fixed jaw member 55 has a forward cylindrical face 60 which encloses a pocket constituting substantially a half of the measuring chamber. This fixed jaw member is carried around bodily in its circular path of travel as the turret rotates but has no movement relative to the turret. The cylindrical face 60 provides a back wall for the measuring chamber.

The movable jaw member 57 is also shaped along one side in a cylindrical face 65, this being at the rear edge of the jaw when considered relative to the moving turret. The cylindrical part 65 provides the front half pocket wall for the measuring chamber. Movement of the jaw 57 will be next considered.

The jaw 57 is slotted vertically at 66 to provide clearance for a vertically extending rock shaft 67 which oscillates within the flange wall 58 of the turret. At the bottom the jaw 57 is horizontally slotted as at 68 (Figs. 5 and 6). This slot extends radially as to the turret shaft 52, the walls of the slot being parallel.

The slot 68 provides a slideway for a rectangular block 69 which is secured to the lower end of the shaft 67. It is connected with the shaft by a cap screw 70. As the shaft 67 oscillates the block 69 the latter, acting upon the walls of the slot 68, effects a movement of the jaw 57 which, however, is anchored against turning and can only move in a prescribed path. This is such as to hold a forward outer edge 71 adjacent one side edge of the tunnel discharge opening 23 during filling of the measuring chamber and even after the compression begins.

The jaw 57 at its inner end and on top is cut back in a recess 72 in which is disposed an enchorage link 73. This link is pivotally connected by a pin 74 to the innermost end of the jaw. At the opposite or outer end, the link pivotally engages a stud 75 which is clamped in an opening formed in the flange wall 58 of the turret. It is held in fixed position by a lock nut 76.

By reason of this link connection the jaw 57 is caused to hold its edge 71 in proper position when it shifts under oscillation of the block 69. The walls of the vertical slot 66 in the jaw member sliding on the shaft 67 also assists in this controlled movement of the jaw. It is this oscillation of the shaft 67 that opens or contracts the measuring chamber 54 as the jaw member 57 shifts forward and away from the fixed jaw 55 or moves closer to the latter. The open position is illustrated in Fig. 5 where a measuring chamber is shown as passing the discharge opening 23 of the tunnel.

Each shaft 67 at its upper end carries an arm 81 (Figs. 5 and 6) the outer end of which carries an upwardly extending pin 82 on which a cam roller 83 is mounted. As the turret 51 is carried around its circular path of travel by the rotating shaft 52 the cam roller 83 is caused to traverse a cam groove 85 formed in the bottom face of a cam 86 which is disposed above the turret 51, this cam loosely surrounding the upper end of the shaft 52.

The cam 86 is secured at its upper end to a stationary cam housing 87 which also loosely surrounds the shaft 52 and is secured to a gear box 88 mounted upon or preferably formed integrally with the frame 53. This gear box encloses the upper end of the shaft 52. This travel and actuation of each cam roller 83 within the cam groove 85 of the stationary cam 86 provides for the proper opening and closing of the corresponding jaws 55, 57 of a measuring chamber 54.

A rotary cutting disc 91 (Fig. 5) is mounted on one end of a horizontal shaft 92 which is journaled in a bracket 93 secured to the tunnel wall 26. The outer or cutting edge of the cutter 91 passes just inside of the extension of the curved inner wall of the tunnel part 26 where it is a slight distance within and just on the edge of the discharge opening 23 of the tunnel. The fish which passes into each measuring chamber from the tunnel is swept past the rotating cutter and is thereby cut as will be further explained later.

Shaft 92 carries a spur gear 94 which meshes with a similar gear 95 mounted upon an intermediate shaft 96 which is parallel to the shaft 92 and which is journalled in a bearing 97 formed as a part of the bracket 93. The spur gear 95 may be an integral part of a bevel pinion section 98 which in its turn meshes with and is driven by a bevel gear 99 carried on a drive shaft 101. This shaft may constitute one of the drive shafts of the canning machine of which the parts being described constitute separate elements.

The shaft 101 is also used as a propelling means for a portion of the actuation of the fork 25. It will be recalled that this fork movement is in part the result of the shifting of the segment 36 within the opening 37 of the tunnel. In this shifting action already described the fork is moved forward to propel the fish along the tunnel and out of the discharge opening or is moved back on a return stroke when the fork has completed a discharge of fish. The additional required actuation of the fork which is effected from the shaft 101 has to do with the plunging of the fork into the fish mass and its withdrawal therefrom and attention will now be directed to this feature.

The fork 25 (Figs. 1 and 5) is clamped in a head 105 which is pivotally connected by a pin 106 to the outer or free end of a lever 107. Lever 107 is pivotally mounted on a pin or stud 108 of a bracket frame 109 which may be an integral part of the tunnel 21 and it extends forward and alongside of the frame extension 41.

Intermediate the ends of the lever 107 a bolt 111 is carried and provides a pivotal connection for a connecting rod 112. The opposite end of this rod is pivoted onto a lever arm 113 which is secured to a vertical rock shaft 114 journalled in a bracket 115 which may be an integral part of the housing of the tunnel 21.

A second lever arm 116 is also secured upon the shaft 114 and provides a means to rock the shaft, this arm carrying at its outer end a cam roller 117 which operates within the groove of a face cam 118 carried on the drive shaft 101. The shape of the cam groove is such as to cause the fork 25 at the proper time to slide through the rock shaft 31 and be pressed into the fish mass and later preparatory to its lateral reversed movement to withdraw the prongs of the fork from the fish.

It will be observed by comparing Figs. 2, 3 and 4 that the charge of fish within the measuring chamber is substantially compressed before the cutter 91 does much cutting. The cutting is delayed because the outer edge 71 of the movable jaw member 57 keeps sliding over the floor 56 as the turret rotates and the edge therefore remains substantially adjacent the edge of the discharge opening of the tunnel. This is while the fish mass is being compressed by the approaching fixed jaw 55 of the chamber.

Beginning just prior to the completion of the compression of the measured charge in the chamber the movable jaw stops its shifting on the turret floor and immediately following the entire mass of fish is wiped by the cutter 91 which completely severs it from the fish remaining in the tunnel. Mention has been made of an additional trim cut to supplement the cutting action of the cutter 91. This will now be considered.

The trim cutting is made to insure a clean cut of the fish mass and to prevent any skin or bone being wiped back and not cut where the fixed jaw member 55 finally passes the cutter 91. By reason of the circular movement of the trim knife with an advancing measuring chamber, this feature having been briefly referred to, the trimming action takes place in a vertical line. This vertical line of trim is adjacent the outer front edge of the fixed jaw.

The trim knife is designated by the numeral 131 (Figs. 2, 3, 4 and 7) and is bevelled at the lower end in a shear edge 132. When not functioning this edge is just above the top of the measuring chamber 54 as best illustrated in Fig. 2. This is the position of the trim knife at the time the wide open measuring chamber is passing the discharge opening 23 of the tunnel, this also being the time the fish is moving into the measuring chamber. During such filling of the measuring chamber the rear or fixed jaw member 55 of the chamber is constantly advancing and some compression of the fish mass has already taken place by the time the fixed jaw comes alongside of the knife. Thereupon the trim knife starts moving laterally with the jaw and also downwardly to trim the fish.

Fig. 3 illustrates the trim knife just after it has started on its downward movement and it will be observed that the forward outer edge of the fixed jaw member 55 is adjacent the trim knife. During the further compression and until the fish mass is severed by the cutter 91 the trim knife 131 descends in a straight line as it is carried along with the forward edge of the fixed jaw member. Fig. 4 illustrates the position of the trim knife when it nears its final stroke the knife at such time being very close to the edge of the cutter 91. Just before the position of Fig. 4 is reached the movable jaw 55 has passed the edge of cutter 91 and the severing by the cutter has begun.

In order to effect the downward and upward movement of the trim knife 131 as well as to provide for its rotary movement along with the fixed jaw the following mechanism is provided. Adjacent the discharge opening 23 of the tunnel and mounted on the upper end of the tunnel wall 27 there is provided a support bracket 133 (Figs. 1 and 8). The inner face of the bracket is grooved at 135. Upper and lower slide gibs 136, 137 are secured in the bracket groove and are bolted in fixed and spaced position. These gibs are formed with oppositely disposed V-slots 138 which provide a slideway for a knife carrier 139.

It is the knife carrier that causes the forward and backward movement of the trim knife and insures travel of the knife with the forward edge of the rear or fixed jaw member during the trimming action. To effect such a movement the knife carrier 139 is formed with a lug 141 (Figs. 1, 5 and 8) which is pivotally connected at 142 to a connecting rod 143. The opposite end of the connecting rod 143 is pivotally connected at 144 to the outer end of a lever 145 which is loosely mounted on the rock shaft 114.

The lever 145 intermediate its length carries a pin 146 on which is pivotally mounted a cam roller 147. The cam roller operates in a cam groove 148 formed on the upper side of a face cam 149. The cam is secured to the upper end of the drive shaft 101 and rotates therewith.

At the forward end of the knife carrier 139 and adjacent the lug 141, the carrier is formed with an inner upwardly extending projection 150 and a cooperating pair of spaced upwardly extending projections 151 (Figs. 1, 5 and 9). On the face adjacent the turret 51, the two projections 151 are recessed to provide pockets for vertically extending spaced slide gibs 152. These gibs are formed with oppositely disposed V-slots 153 (see also Fig. 7) which provide a slideway for a vertically movable slide member 154.

The slide member 154 at its lower end carries a spacer bar 155 to which the trim knife 131 is secured. A block 156 is also secured to the slide member opposite the bar 155 and trim knife 131 and these several parts are screwed together to operate as a unit.

The block 156 provides a universal joint 157 for the lower end of a connecting rod 158. The upper end of the rod is pivotally connected at 159 to the outer end of a lever 161 which is secured to a rock shaft 162 journalled in suitable bearings within the gear box 88. The rock shaft 162 also carries an arm 163 the outer end of which carries a pin 164 on which is rotatably mounted a cam roller 165. This cam roller operates in a cam groove 166 of a barrel cam 167.

The barrel cam 167 is mounted upon a short vertically extending shaft 171 which is journalled in bearings formed in the gear box 88. This shaft 171 directly beneath the cam 167 carries a spur pinion 172 which meshes with a gear 173 mounted upon an intermediate vertically disposed shaft 174 journalled in a bearing 175 formed in the gear box. The shaft 174 is continually rotated by connection with the turret shaft 52 and for this purpose shaft 174 carries a pinion 176 which meshes with a gear 177 secured to the upper end of the shaft 52 (see also Fig. 6).

From the foregoing it will be understood that the forward and backward movement of the trim knife is made possible by the cam actuated knife carrier 139 which slides back and forth in the stationary bracket 133 and which carries the trim knife back and forth in its movement. It is the action of the cam 149 which effects this backward and forward travel.

There is quite an overhang of the knife carrier 139 and parts carried thereby where it extends beyond the bracket 133. To more positively support the carrier adjacent the heavy projections 150, 151 and the slide parts moving therein, additional support is provided over the major width of the tunnel 21. A floor member 178 (Figs. 10 and 11) is inserted in the top wall of the tunnel adjacent its mouth for this purpose.

It will be recalled that the curved knife carrier 139 sliding within its curved bracket 133 moves the trim knife and the forward part of the carrier in a curved path corresponding to the curvature of the turret 51. The carrier 139 extends down inside of the inner edge of the floor member 178 in a series of steps 179 which are all curved throughout their horizontal extent to match this curved path of movement of the knife carrier. This step arrangement provides a better support for the carrier and parts carried thereby.

It will also now be evident that the upward and downward movement of the trim knife is brought about by the shifting of the slide 154 within the guideways formed in the knife carrier projection gibs 152. The barrel cam 167 effects this movement. The cam grooves 148 and 166 of the respective cams 149, 167 are so coordinated as to effect proper timing of the various phases of the step trimming action exemplified in Figs. 2, 3 and 4 already fully described.

To prevent loss of fish around the rotary cutter the tunnel side of the cutter is backed up by a hardened metal insert 181 (Figs 5 and 9) which is secured to the tunnel wall. By reason of the necessary back and forth movement of the trim knife 131 there is only one projection 150 on one side as already described. To fill the space on the side of the knife 131 opposite to the projection 150 there is provided a chain sealing device 182 (see also Fig. 10.) This chain device is flexible and is adapted to fill the space just above the tunnel which varies in its width in accordance with the relative position of the trim knife at any particular part of its cycle.

The chain device 182 is free at one end but is pivotally secured at the other end on lugs 183 formed on a depending part 184 of one of the projections 152. When the trim knife 131 is in its furthest position from the cutter 91, this being with the tunnel wide open and this being the position of Fig. 9, the greatest length of the chain of the sealing device 182 is in use. By reason of the flexibility of the chain the inner surface where it strikes against the cylindrical wall of the turret provides a slide fit therewith and the chain functions as a gate to prevent fish passing out at the top of the tunnel.

Provision is made for actually controlling the positioning of the chain 182 so that it will fall into the proper closing position adjacent the surface of the turret. For this purpose the back edge of the chain slides along one of the step joints 179 of the insert 178 as the knife carrier 139 carries the knife 131 in its circular path of travel.

Adjacent the edge of the tunnel nearest to the cutter 91 there is located a hardened steel insert piece 185 which is secured and projects upwardly from the top of the tunnel 21 adjacent the floor insert 178 as best illustrated in Figs. 9 and 10. This insert piece extends up between the inner face of the chain 182 and the moving turret 51 and as the trim knife 131 approaches the cutter 91 the chain is deflected by the insert piece and is caused to move back into a curved slot 186 cut in the upper surface of the top wall of the tunnel.

Directly opposite the insert 185 and beyond the confined chain 182, the inner face of the insert floor member 178 is beveled as at 187 and this bevel merges into one of the walls of the groove 186. By means of this construction the chain at all times comes into proper position to engage against the outer surface of the traveling turret irrespective of the position of the trim knife 131. When the trim knife is nearest to the cutter 91 the maximum of the chain is contained within the groove 186 of the tunnel wall.

A shield plate 188 is located over the rotary cutter 91 to protect its cutting edge and to act as a guard. It may be secured to and supported by the tunnel wall 26.

After a filling chamber has been moved past the cutter 91 and its movable jaw member 57 has been brought into its closed position relative to the fixed jaw member 55, the shaped charge of fish therein is ready to be forced down into an empty can 189 (Fig. 6) which is carried by the turret 51. The can is brought into the turret in any suitable manner and fuller details of this may be found if desired in the Rooney patent previously mentioned. For present purposes it need only be mentioned that the can is directly beneath the carried by the turret and is directly beneath the measuring chamber. The charge of fish is separated from the can by the floor 56 of the turret.

When the compressed fish charge within the measuring chamber is ready to be forced into the aligned can the charge of fish is brought over a discharge opening 191 (Fig. 6) cut in the turret floor 56. There is then no obstruction between the empty can below the measuring chamber and the charge of fish therein. A filling plunger 192 thereupon moves down and forces the fish from the measuring chamber and deposits it into the can.

Prior to this ejecting of the mass of fish from the measuring chamber, a vent blade 193 is inserted into the empty can and this blade remains within the can while the plunger descends. It is withdrawn just prior to the plunger reaching its lowermost position.

The vent blade 193 operates within a groove 194 formed in the filling plunger 192. It is formed with a vertically disposed groove 195 cut in its outer face and this groove provides a passageway for the air to escape from the can as the charge of fish enters under the downward movement of the plunger. The vent blade when descending and also after reaching its lowered position within the can, as illustrated in Fig. 6, is vented from above as its groove 195 terminates above the floor 56 of the tunnel and communicates with an opening 196 formed in a wall of the turret.

The plunger 192 is mounted on the lower end of a slide 201 (Figs. 5 and 6) which operates in a slideway 202 formed in a block section 203 (see also Fig. 1) which is an integral part of the turret, adjacent block sections being connected together by a circular strap section 204. A plate 205 is secured to each block section 203 and retains its slide in its slideway 202.

At the upper end the slide 201 carries a pin 211 on which is rotatably mounted a cam roller 212. This roller operates within a cam groove 213 formed in the peripheral wall of the cam housing 87. This cam housing being stationary, the cam groove 213 provides a track for the moving roller 212 which forces down the slide 201 and with it the filling plunger 192, these movements being in proper time to fill the can with the compressed charge of fish.

Each vent knife 193 is connected at its upper end by a pin 215 (Figs. 5 and 6) to the inner end of a horizontal arm 216. The arm 216 is bolted at 217 to the lower end of a rod 218 which has vertical sliding movement within a bearing 219 formed in its block section 203. Each rod 218 in its turn carries a pin 221 at its upper end on which is rotatably mounted a cam roller 222. This cam roller traverses the cam groove 213 of the cam housing 87. By reason of the shape of the cam groove the vent knife 193 for each filling chamber advances just ahead of the filling plunger 186 and each vent knife is also withdrawn just prior to the return upward movement of its filling plunger.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a fish canning machine, the combination of a supply tunnel having a discharge opening at one end, a plurality of measuring chambers movable successively past said opening, instrumentalities for compressing the fish while pushing it out of said opening and into a passing measuring chamber, a cutter located adjacent said opening and operating between said tunnel and said moving chamber for cutting the compressed charge of fish within said measuring chamber to separate it from the fish in said tunnel, and a trim knife movable transversely across said discharge opening and also movable toward said cutter for fully severing the measured fish charge from the fish remaining in said tunnel.

2. In a fish canning machine, the combination of a supply tunnel having a discharge opening at one end, a turret rotatably disposed adjacent said opening, a plurality of measuring chambers carried by said turret and adapted to be moved successively past said opening, instrumentalities for compressing the fish while pushing it out of said opening and into a passing measuring chamber, a cutter located adjacent said opening and operating between said tunnel and said turret for cutting the compressed charge of fish within said measuring chamber to separate it from the fish in said tunnel, a trim knife movable transversely across said discharge opening, and a knife carrier for also advancing said moving trim knife during trimming in a circular path toward said cutter for fully severing the measured fish charge from the fish remaining in said tunnel.

3. In a fish canning machine, the combination of a supply tunnel having a discharge opening at one end, a turret located at the end of said opening and having rotation on a vertical axis, a plurality of measuring chambers carried by said turret, each chamber being successively moved past said discharge opening as said turret rotates, instrumentalities for compressing the fish while pushing it out of said opening and into a passing measuring chamber, a rotatable cutter located at one side of said discharge opening and operating between said tunnel and said moving chamber for cutting the compressed charge of fish in said measuring chamber to separate it from the fish in said tunnel, a trim knife movable across said discharge opening for fully severing the cut and measured fish charge from the fish remaining in said tunnel, means for moving said trim knife back and forth in a circular path of travel to cause it to advance alongside of a wall of said measuring chamber when moving forward and during the rotative movement of the chamber, and vertically moving means for lowering said knife during such forward advancement.

4. In a fish canning machine, the combination of a supply tunnel having a discharge opening at one end, a turret rotatably disposed adjacent said opening, a plurality of measuring chambers carried by said turret and adapted to pass by said opening, instrumentalities for compressing the fish while pushing it out of said opening and into a passing measuring chamber, movable jaw members carried by said turret, each movable jaw forming the forward wall of a said chamber, a rotatable cutter disposed at one side of said tunnel opening and in the path of the compressed fish extending into and being swept forward by a passing chamber for cutting the chamber charge of fish from the fish in said tunnel, means for momentarily holding each movable jaw adjacent said cutter while its measuring chamber charge of fish is being cut, and a trim knife movable transversely across said discharge opening and also movable toward said cutter for fully severing the measured fish charge from the fish remaining in said tunnel.

5. In a fish canning machine, the combination of a supply tunnel having a discharge opening at one end, a turret rotatably disposed adjacent said opening, a plurality of measuring chambers carried by said turret and adapted to pass by said opening, instrumentalities for compressing the fish while pushing it out of said opening and into a passing measuring chamber, the end walls of each measuring chamber being formed with fixed and movable jaw members, a rotatable cutter disposed at one side of said tunnel opening and in the path of the compressed fish extending into and being swept forward by a passing chamber for cutting the chamber charge of fish from the fish in said tunnel, means for momentarily holding each movable jaw adjacent the edge of said cutter while its measuring chamber charge of fish is being cut, a trim knife movable at right angles to the movement of said turret for trim severing the chamber charge of fish along the edge of said fixed jaw member, and means for moving said knife along with said fixed jaw member during said trim severing operation.

6. In a fish canning machine, the combination of a supply tunnel having a discharge opening at one end, a turret rotatably disposed adjacent said opening, a plurality of measuring chambers carried by said turret and adapted to pass by said opening, instrumentalities for pushing the fish out of said opening and into a passing measuring chamber, movable and fixed jaw members forming an expansion and a contraction for said chamber, said jaw being carried by said turret, each movable jaw forming the front wall of a said chamber while each fixed jaw forms the rear wall thereof, means for momentarily holding each movable jaw adjacent one edge of said discharge opening while its measuring chamber charge of fish is being moved forward to effect a contraction of said chamber for compressing the fish therein, a trim knife movable downwardly as the fish is being compressed for severing the chamber charge of fish from the fish remaining in said tunnel, and means for moving said trim knife with said measuring chamber during said trim severing operation.

7. In a fish canning machine, the combination of a supply tunnel having a discharge opening at one end, a turret rotatably disposed adjacent said opening, a plurality of measuring chambers carried by said turret and adapted to pass by said opening, instrumentalities for compressing the fish while pushing it out of said opening and into a passing measuring chamber, the end walls of each measuring chamber being formed with fixed and movable jaw members, a rotatable cutter disposed at one side of said turret opening and in the path of the compressed fish extending into a passing chamber for cutting the chamber charge of fish from the fish in said tunnel, means operating through each of said movable jaw members for reducing the size of its measuring chamber and at the same time compressing the charge of fish therein, and a link device connected to each movable jaw member for maintaining the front edge of said jaw member at a constant distance from the center of said turret while the jaw member is compressing the fish and while the fish charge within said measuring chamber is being cut by said cutter.

8. In a fish canning machine, the combination of a supply tunnel for the storage of fish having a discharge opening at one end, an expendible and contractible measuring chamber for receiving and confining a predetermined quantity of the fish said chamber being movable past said opening, a feeding fork for pushing the fish out of said opening and into said passing measuring chamber, means for fully expanding said chamber when receiving said fish, a cutter located adjacent said opening and operating between said tunnel and said moving chamber for cutting the charge of fish within said measuring chamber from the fish in said tunnel, said chamber expanding means operating to contract the chamber and compress the fish confined therein during the said cutting thereof, and a trim knife movable transversely across said discharge opening for cutting the chamber confined fish vertically during its compression thereby cooperating with said cutter to cleanly segregate the predetermined measured fish in said chamber.

HORACE J. PAYNTER.
WALTER E. ROONEY.